Sept. 29, 1964     E. GOEBEL     3,150,733
WALKING MECHANISMS FOR MOVING HEAVY LOADS
Filed March 17, 1961     2 Sheets-Sheet 1

INVENTOR
ERNST GOEBEL
by Bair, Freeman & Molinare
Attys.

INVENTOR
ERNST GOEBEL
by Bair, Freeman & Molinare Attys.

United States Patent Office 3,150,733
Patented Sept. 29, 1964

3,150,733
WALKING MECHANISMS FOR MOVING
HEAVY LOADS
Ernst Goebel, Bad Oeynhausen, Germany, assignor to
Eisenwerk Weserhütte A.G., Bad Oeynhausen, Germany, a German company
Filed Mar. 17, 1961, Ser. No. 96,464
Claims priority, application Germany Mar. 23, 1960
7 Claims. (Cl. 180—8)

The invention relates to improvements in walking mechanisms for moving heavy loads such as, for example, heavy equipment in earthwork and open-cast mining.

Walking mechanisms are already known wherein two walking plates are used which lift the equipment beyond the centre of gravity in which case the inclined portion of the equipment trails along during the walking. Walking mechanisms are also known wherein inclination of the equipment is avoided as a result of the fact that three or more walking legs are provided, by which the equipment is moved while retaining its horizontal position. In this case, each such walking leg comprises variable-length members extending between the equipment and a foot-plate so that three foot-plates and nine such members are employed. On each step of the equipment, these nine members are subjected to different variations in length and it is extremely difficult to control them in such a manner that uncontrollable forces do not arise. The consequence of this is that the equipment has to be more robust in construction in order to ensure against overstressing and as a result the walking mechanism becomes uneconomical. On the other hand, if an attempt is made to prevent the stresses from arising by introducing suitable instruments, the control of the equipment becomes complicated and intricate.

It is an object of the present invention to provide an improved walking mechanism wherein the disadvantages referred to above are materially reduced.

According to the present invention a walking mechanism for moving heavy loads comprises three walking legs each comprising a foot-plate and pair of extensible members connected to the foot-plate at a common point by a universal joint mechanism, the extensible members being connected to a load member at spaced locations by universal joint mechanisms such that the lines joining the points of intersection of each pair of extensible members with a horizontal plane form a triangle when extended.

Some embodiments of the present invention will now be described by way of example, reference being made to the accompanying diagrammatic drawings in which.

Figure 1:
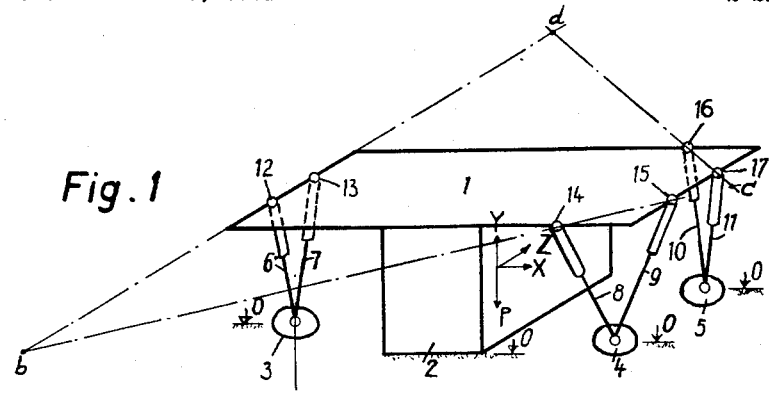
FIGURES 1 to 4 show the movement action of a load with three walking legs.
Figure 2:
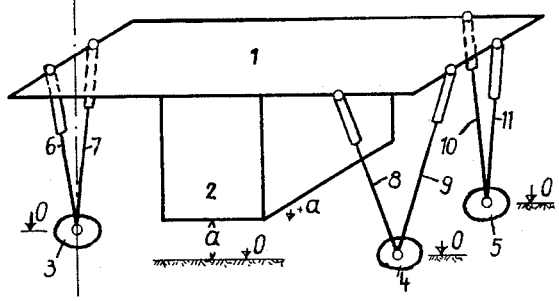
Figure 3:
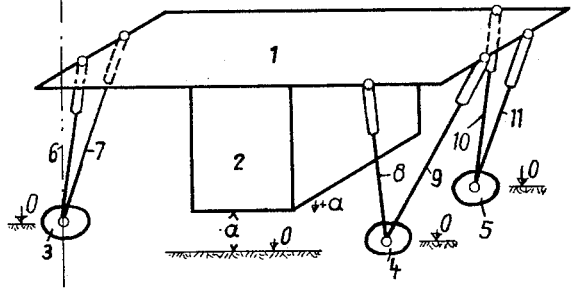

In FIGURES 1 to 4, a load member 1, which may be a load supporting member, the load itself or a piece of equipment to be moved, is provided with a base 2, with which it rests on the ground in the position of rest, and three walking legs each comprising a foot-plate 3, 4 and 5 respectively and two extensible members or legs 6 and 7, 8 and 9, and 10 and 11 respectively. The legs 6, 7, 8, 9, 10 and 11 are connected to the load member 1 at spaced locations by means of universal joint mechanisms 12, 13, 14, 15, 16 and 17 respectively, for example ball-and-socket joints. Each pair of legs 6 and 7, 8 and 9, and 10 and 11 is connected to the associated foot-plate at a common point by a similar mechanism. In the position of rest shown in FIG. 1, all three foot-plates 3, 4 and 5 as well as the base 2 rest on the ground (indicated by an arrow and the numeral "0") and from this position, the equipment can be moved in any desired direction. The extensible members or legs 6, 7, 8, 9, 10 and 11 will be understood as being members the length of which is capable of being varied within limits. The variation in the length of the six members 6, 7, 8, 9, 10 and 11 may be effected in a known manner, these members, in this example, being constructed in the form of hydraulic cylinders with pistons which can be displaced in either direction relative to the associated cylinder. In order to move the equipment, all six members must first be uniformly extended in order to lift the load member 1 to a distance $a$ from the ground (FIGURE 2). The members 9 and 11 are then extended to move the load member 1 in the direction X. The members 8 and 10 as well as 6 and 7 can remain unaltered for this purpose. The load member 1 then assumes the position shown in FIGURE 3. In order to place it on the ground again, the members 9 and 11 are further extended, while the members 8 and 10, and the members 6 and 7, are shortened. The equipment 1 then reaches the position shown in FIGURE 4. In order to be able to execute a further step in the direction X, all six members 6, 7, 8, 9, 10 and 11 are first shortened and then the members 8 and 10 are again extended somewhat until the three foot-plates 3, 4 and 5 stand in the initial position shown in FIGURE 1.

Starting from the raised position of the equipment 1 as shown in FIGURE 2, the load member 1 can be moved in any other desired direction or rotated about its axis by appropriate lengthening or shortening of the individual extensible members. The control for all these movements is simple because only six members have to be varied in length.

The straight lines passing through the points of connection of the extensible members to the load member 1 by the universal joint mechanisms 12 and 13, 14 and 15, and 16 and 17 respectively, form the sides of the triangle $b, c, d$ as can be seen from FIGURE 1, these points of connection lying in a horizontal plane. The points of connection of the members to the load member do not, however, have to lie in a horizontal plane as shown. For example, the two joints 12 and 13 of the members 6 and 7 may act on the load higher or lower than the joints 14 and 15 or 16 and 17. There may also be a difference in height between the points of application of two associated members, that is to say each of the three foot-plates 3, 4 and 5 may be connected to the load member by means of one long and one short extensible member. The joints then lie in separate horizontal planes. In each case, however, the projections of the three straight lines passing through the points of intersection of a horizontal plane with the extensible members 6, 7, 8, 9, 10 and 11 must form the sides of a triangle.

The arrangement described with reference to FIGS. 1 to 4 has the advantage that only accurately calculable forces can arise so that the design of the equipment may be economical and the control of the extensible members simple. Additionally, only six members have to be controlled to execute movement in any direction.

Figure 4:
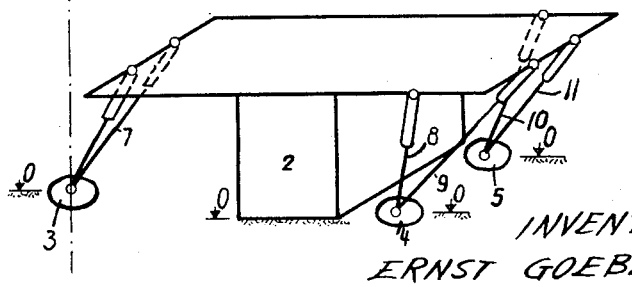
Figure 5:
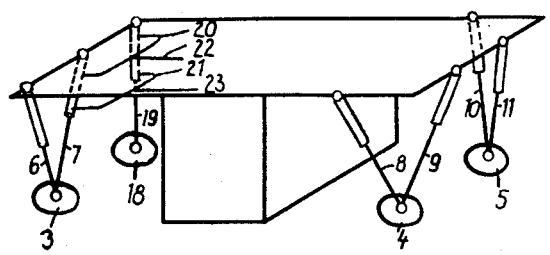
FIGURE 5 shows a piece of equipment on three walking legs and one support leg.

The equipment may be improved, whilst retaining the advantages previously referred to, by the provision of a support leg coupled to one of the walking legs. Such an arrangement will now be described with reference to FIG. 5. In this embodiment, the load member 1 is provided, as before, with three walking legs consisting of the foot-plates 3, 4 and 5 and of the extensible members or legs 6 and 7, 8 and 9, and 10 and 11 respectively and there is additionally provided a support leg consisting of a foot-plate 18 and an extensible member or leg 19 connected to the foot-plate 18 and the load member 1 by universal joint mechanisms. The equipment acquires greater stability as a result of the provision of this support leg. In order that the control may remain simple, the leg 19 is here connected to the leg 7 through a fluid linkage comprising coupling members 20 and 21 and supply lines 22 and 23. As a result, the two foot-plates 3 and 18 come to rest evenly. When this equipment has reached a position as shown in FIGURE 4 and it is desired to restore the two foot-plates 3 and 18 to the position shown in FIGURE 5, only the members 6, 7 and 19 have to be shortened for this.

Figure 6:
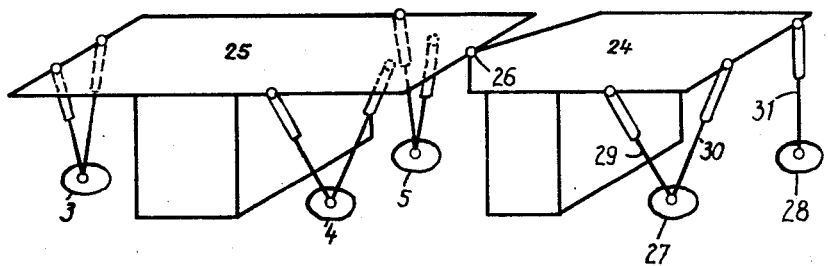
FIGURE 6 shows equipment constructed in the form of an articulated carrier.

In some cases two or more load members, articulated one to another by universal joints, may require to be moved. In this case, one of the load members would be provided with three walking legs as described with reference to FIGS. 1 to 4 or with three walking legs and a support leg as described with reference to FIG. 5. The or each of the other bodies only requires two walking legs, the function of the third such leg being taken over by the universal joint between two such members. With such an arrangement, a plurality of associated individual loads, such as, for example, the drive and parts of sectional ground conveyors, can be moved jointly. One such arrangement will now be described with reference to FIG. 6. In this embodiment, the load consists of two load members or bodies 24 and 25. The body 25 is connected to the body 24 through a universal joint 26. Three walking legs are provided for the load member 24 in a manner similar to that described for the load member 1 (FIGS. 1 to 4). The body 24, like every additional following part, which may be provided, rests only on two foot-plates 27 and 28 which are connected to the body 24 by the variable-length extensible members 29, 30 and 31 respectively, through universal joints. The two articulately connected bodies 24 and 25 are thus supported in a statically determined and kinematically perfect manner and can be moved in any direction by actuation of the extensible members. The movement is preferably effected in such a manner that the bodies 24 and 25 remain on the same longitudinal axis. It is also possible, however, after movement has been effected, to set the parts on the ground in such a manner that the longitudinal axes of the bodies 24 and 25 form any desired angle with one another.

What I claim is:

1. A walking mechanism for moving heavy loads comprising a load member and at least three legs, each of said three legs comprising a foot-plate and a set of two extensible members only attached to the associated foot-plate by a common universal joint mechanism and to said load member by separate universal joint mechanisms disposed at spaced locations in the same plane, said locations being selected to be such that the lines joining points of intersection of each set of members with said plane, when extended, form a triangle.

2. A walking mechanism for moving heavy loads comprising a load member, three separate foot-plates, a set of two extensible members only associated with each foot-plate, a universal joint mechanism attaching each set of extensible members to the associated foot-plate and a separate universal joint mechanism attaching each extensible member to the load member at spaced locations in the same horizontal plane selected such that a triangle is formed in said plane intersecting said extensible members by lines joining the points of intersection of each set of extensible members with said plane, said lines being extended beyond said points of intersection.

3. A walking mechanism for moving heavy loads comprising a load member, at least three separate foot-plates, a set of two extensible members only associated with each foot-plate, a universal joint mechanism attaching each pair of extensible members to the associated foot-plate and a separate universal joint mechanism attaching each extensible member to the load member at spaced locations contained in a common horizontal plane and disposed such that the lines joining the points of attachment of each set of extensible members to the load member, when extended, form a triangle in said plane.

4. A walking mechanism for moving heavy loads comprising a load member, at least four separate foot-plates, a set of two extensible members only associated with each of three of said foot-plates, a further extensible member associated with the fourth of said foot-plates, a universal joint mechanism attaching each set of extensible members to the associated foot-plate, a further universal joint mechanism attaching said further extensible member to said fourth foot-plate, a link connecting said further extensible member to one extensible member of one of said sets of extensible members, a separate universal joint mechanism connecting each of said extensible members to said load members at spaced locations in the same horizontal plane such that a triangle is formed, in said plane intersecting said sets of extensible members, by lines joining the points of intersection of each set of extensible members with said plane, said lines being extended beyond said points of intersection.

5. A walking mechanism for moving heavy loads comprising two load members, a universal joint connection between said load members, at least five separate foot-plates, a set of two extensible members only associated with each of four of said foot-plates, a universal joint mechanism attaching each of said sets of extensible members to an associated foot-plate at a common point, a further extensible member associated with the fifth of said foot-plates, a further universal joint mechanism attaching said further extensible member to said fifth foot-plate, a separate universal joint mechanism attaching each of said extensible members to said load members at spaced locations, said further extensible member and one of said sets of extensible members being attached to one of said load members and the remaining three sets of extensible members being attached to the other of said load members at locations in the same horizontal plane such that a triangle is formed in said plane intersecting said remaining three sets of extensible members by lines joining the points of intersection of each set of said remaining three sets of extensible members with said plane, said lines being extended beyond said points of intersection.

6. A walking mechanism for moving heavy loads comprising two load members, a universal joint connection between said load members, at least five separate foot plates, a set of two extensible members only associated with each of three of said foot plates, a universal joint mechanism attaching each set of extensible members to the associated foot plate at a common point, a separate universal joint mechanism attaching each of said extensible members to one of said load members at spaced locations in the same horizontal plane selected such that a triangle is formed in said plane intersecting said extensible members by lines joining the points of intersection of each set of said extensible members with said plane, said lines being extended beyond said points of intersection, three further extensible members associated with the fourth and fifth foot plates, one of said further extensible members being associated with the fourth foot plate and two of said further extensible members being associated with the fifth foot plate, another universal joint mechanism attaching said one further extensible member to said fourth foot plate, a further universal joint mechanism attaching said two further extensible members to said fifth foot plate, and still further universal joint mechanisms connecting each of said further extensible members to the other of said load members at spaced locations.

7. A walking mechanism according to claim 6, including a sixth foot-plate, an additional extensible member, an additional universal joint-mechanism connecting said additional extensible member to said sixth foot-plate and a further additional universal joint mechanism connecting said additional extensible member to said one load member.

References Cited in the file of this patent

UNITED STATES PATENTS

| | | |
|---|---|---|
| 2,785,761 | Becker | Mar. 19, 1957 |
| 2,942,676 | Kraus | June 28, 1960 |

FOREIGN PATENTS

| | | |
|---|---|---|
| 1,083,133 | Germany | June 9, 1960 |